March 14, 1967 A. FERRETTI ET AL 3,309,643
ELECTRIC HEATING ELEMENT
Filed Jan. 2, 1964
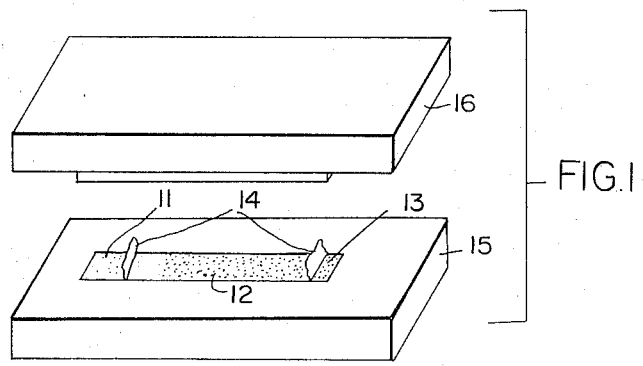
FIG. 1
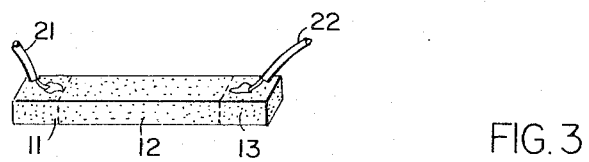
FIG. 2
FIG. 3
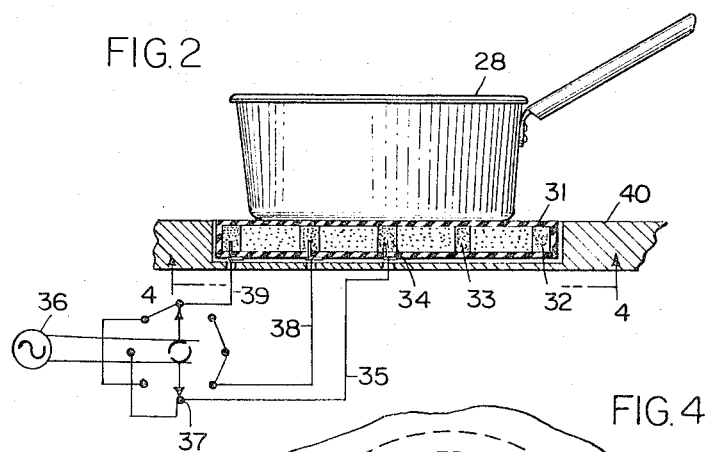
FIG. 5a
FIG. 5b
FIG. 4
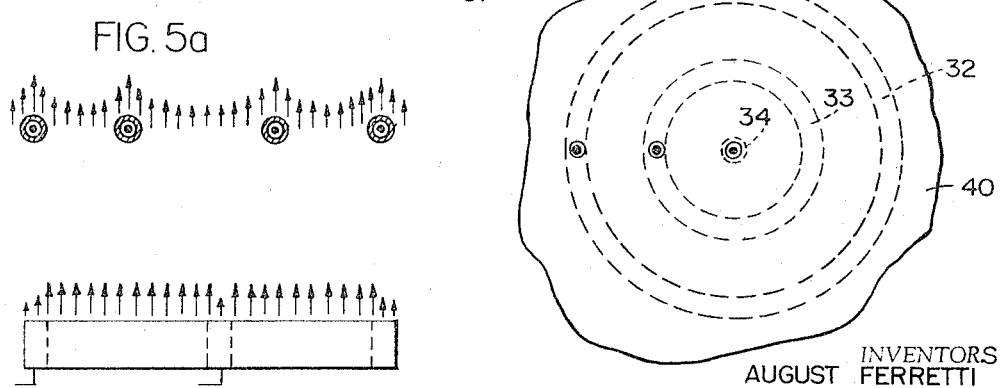
INVENTORS
AUGUST FERRETTI
RICHARD W. GERMANN
BY
Richard F. Benway
ATTORNEY

United States Patent Office 3,309,643
Patented Mar. 14, 1967

3,309,643
ELECTRIC HEATING ELEMENT
August Ferretti, Cambridge, and Richard W. Germann, Boston, Mass., assignors to Massachusetts Institute of Technology, Cambridge, Mass., a corporation of Massachusetts
Filed Jan. 2, 1964, Ser. No. 334,999
7 Claims. (Cl. 338—330)

This invention relates to electric heating elements and more particularly to elements that are fabricated in a solid form.

Conventional heating elements are usually constructed from wire in either of two fashions or from rods made of refractory metals or semiconductor type materials. The latter are very delicate and must be suspended free from contact with oven or heating apparatus in which it is suspended. The wire is wound directly onto an insulating material or alternatively embedded within insulating material that fills a metallic tube. In the former element, heating takes place largely by radiation while the latter element heats largely by conduction. In either case, an inherent limitation presents itself in that the units are unable to distribute the heat uniformly with the attendant avoidance of hot spots. To meet this limitation, most heating vessels provide some means for distributing the heat produced by the element in the form of an improved heat conducting quality at the bottom of the vessel or merely providing an increase in mass at the bottom of the metal vessel.

The present invention overcomes this heat distribution limitation; for effectively, it is an infinite number of heating elements distributed uniformly over a given area. Furthermore, where a large mass is necessarily involved in the heating vessel or in the element itself, because it is embedded in insulating material that in turn fills a metallic tube, a great deal of thermal inertia is experienced. An overall reduction in efficiency results as a consequence of a high thermal inertia. For, as is a normal practice, when a substance has been fully heated it will be removed from the heating element and the power turned off. The quantity of heat that is stored in the system at that moment will be dissipated in the air, that is, wasted.

Conventional elements have openings or crevices that permit the entry of unwanted foreign particles. These particles ultimately burn generating fumes and render the heating element difficult to clean. The present invention presenting a perfectly smooth solid surface entirely eliminates this difficulty.

Wherein the present invention affords an infinite number of heating points, the required temperature of any given point is substantially reduced. Conventional heating elements on the other hand have a limited number of heating points thereby attaining much higher spot temperatures for a corresponding overall temperature. This latter feature extends the life of the present invention over that of the conventional unit by eliminating burn-outs due to overheating of individual points on the element.

Moreover, when a low, continuous heat is required, the usual heating element further confines the heating to a much smaller area when it would be preferable to spread the heat over a much greater area to avoid possible burning of the heated substance. The present invention on the contrary spreads the heat over a large area enhancing its use at low heats.

The present invention can be formed in many desirable shapes of many different colors. As asserted above, the element will operate with lower spot temperatures and is easily cleaned, thereby able to retain the original colors. Such a feature lends a certain esthetic quality to the present invention unknown in the prior art.

Therefore, an object of this invention is to provide a simple, more durable electric heating element.

Another object of this invention is to provide an electric heating element that distributes heat uniformly across its surface.

Another object of this invention is to provide an electric heating element that has low thermal inertia.

Another object of this invention is to provide an electric heating element that permits more efficient heating.

Another object of this invention is to provide a heating element that has a flat smooth surface that is easily cleaned.

Another object of this invention is to provide a heating element in color.

Another object of this invention is to provide a heating element capable of being manufactured in a large variety of shapes including curvilinear forms for ovens.

Further objects and advantages of our invention will become more apparent by reference to the following description when taken in conjunction with the accompanying drawings of which:

FIGURE 1 shows a die where the materials are pressed into shape.

FIGURE 2 shows a rectangular heating element.

FIGURE 3 shows a round heating element with provision for two separate heats.

FIGURE 4 is a bottom view of FIGURE 2.

FIGURE 5A shows the relative heat distribution across the cross section of a conventional heating element.

FIGURE 5B shows the relative heating distribution across the cross section of the present invention.

Referring to FIGURE 1, bottom section 15 of a die is shown. The cavity is divided into three compartments by means of paper dividers 13. Compartment 12 is filled with a given mixture of one of the following: $Al_2O_3$, or $ZrO_2$, or MgO or $SiO_2$ or other suitable refractory insulators or various combinations thereof and metal. Common combinations of the refractory insulators are: mullite porcelain (70 $Al_2O_3$, 27 $SiO_2$, 3 $MO+M_2O$); high alumina porcelain (90 to 95 $Al_2O_3$, 4 to 7 $SiO_3$, 1 to 4 $MO+M_2O$); and stealtite porcelain (35 MgO, 60 $SiO_2$, 5 $Al_2O_3$). Compartments 11 and 13 are filled with a mixture of the same material bearing a much higher ratio of metal to refractory. To provide elements of consistent resistivities, the material must be proportioned out by weight.

Before the materials are put into a die, they are prepared as follows:

(1) A given quantity of a finely divided refractory insulator is selected.

(2) A given quantity of a preselected finely divided (on the order of 325 mesh) metal in the predetermined ratio by volume of metal to refractory insulator is selected.

(3) The materials are intimately mixed as will be more fully described.

(4) A small quantity of the mixture is then remixed with additional metal powder to increase the ratios of metal to refractory for end zones 11 and 13.

For an inexpensive small heating element for use at 120 volts, one part of Nichrome, which is composed of approximately 80% nickel and 20% chromium, can be mixed with four parts aluminum oxide ($Al_2O_3$). A portion of that mixture can be remixed in the ratio one part of the mixture to seven parts metal to produce a rich metal mixture for the end zones.

A simple method of mixing the desired material together is to do so mechanically in a ball mill; however, the substance indicated above would have to be mixed for approximately twenty four hours. A more sophisticated method employing precursor compounds can reduce this mixing period to the order of a few minutes. Several examples of such a method are as follows:

(A) A metal powder and a refractory insulator precursor may be used, or (B) a refractory insulator powder and a metal precursor may be used or (C) both metal and refractory insulators may be used in the form of precursors.

(A) No. 1.—Finely divided iridium powder is mixed with an amount of zirconyl nitrate $Zr(NO_3)_4 \cdot n(H_2O)$ such that upon the thermal decomposition of the zirconyl nitrate, brought about by the careful heating of the mixture, the desired metal to insulator ratio results.

(A) No. 2.—Finely divided nickel-chrome alloy powder is covered with a proper amount of a solution of a soluble salt of aluminum ammonium hydroxide solution or ammonium benzoate solution is added until the precipitation is complete. The gelatinous precipitate of aluminum hydroxide is mixed with the metal powder and then thermally decomposes to form a very intimate mixture of metal alloy and aluminum oxide.

(B) No. 1.—Finely divided aluminum oxide is mixed with the proper amount of iron oxide and fired in a hydrogen atmosphere at a temperature between 600° C.–1000° C. The resulting product is an intimate mixture of aluminum oxide and iron.

(B) No. 2.—Finely divided magnesium oxide is mixed with an amount of ammonium chloroplatinate $$((NH_4)_2PtCl_6)$$

such that upon decomposition of the ammonium chloroplatinate brought about by the careful heating of the mixture, the desired metal to insulator ratio results.

(C) No. 1.—A solution containing desired amounts of an aluminum salt and ferric salts are treated with alkalis or ammonium hydroxide or ammonium benzoate in neutral solution. The resulting precipitate is a very intimate mixture of aluminum hydroxide and iron hydroxide. The mixture is fired at red heat to obtain a mixture of aluminum oxide and iron oxide. This mixture is fired in a stream of hydrogen or other suitable gases at 600° C–1000° C. to reduce the iron oxide to iron. The resulting product is a finely divided mixture of iron metal and aluminum oxide.

(C) No. 2.—Proper amounts of ammonium aluminum sulfate $(NH_4Al(SO_4)_2)$ are mixed with ammonium chloroplatinate such that upon the thermal decomposition of the mixture by careful heating, the proper desired aluminum oxide to metal ratio results.

The latter methods are used to obtain better mixing of the metal and the refractory insulator in a shorter period of time than can be obtained by mechanical mixing such as ball milling.

When the materials have been prepared and placed in their respective compartments of bottom section 15 of the die, dividers 14 are withdrawn. Top section 16 of the die is mated with bottom section 15. The die is then inserted in an hydraulic press and pressure applied. In the case of our example of nickel and aluminum oxide, 160,000 p.s.i. was applied. The bar is then removed from the cavity of the bottom section 15 of the die and placed in a muffle furnace and heated to a temperature near 1500° C. in an atmosphere such as hydrogen that will prevent oxidizing the metal for approximately 24 hours to cause the metal to diffuse through and around the particles of refractory oxides. The bar is then allowed to cool to room temperature slowly.

Leads may be attached in a number of different ways. The method used is determined by the type of metal used in the heating element and the final use of the heating element.

For element use below 300° C., leads may be attached using a lead-tin base, solder, or any other suitable solder, providing the base metal of the heating element lends itself to being wet by such alloys.

For element use below 600° C., leads may be attached using silver-copper base alloys, or any suitable alloys generally referred to as hard solder or silver solders. Such solders are used with a suitable flux material or a protective gas atmosphere.

For element use above 600° C. leads may be attached by brazing or welding to the heating element.

Another method of making a junction is as follows; a part of the metal-rich section of the element is heated until drops of the base metal are caused to sweat out of the insulator-metal matrix. The leads may then be fused directly to the droplet area.

If the element base material is subject to excessive oxidation near its melting point, it must be protected from oxidation during the welding or fusing operation. A protective gas or a vacuum atmosphere may be used.

The entire unit is then coated with a glaze of refractory material that insulates the unit electrically and prevents oxidation of the base metal if the unit is operated at elevated temperatures. The material used in the coating ought to be the same as that used in the fabrication of the heating unit, otherwise stress cracking may develop due to the different coefficients of expansion of the materials used.

Many methods of coating the heating element are available; however, a preferred method is that suggested by the Rokide process described in U.S. Patent No. 2,707,691 wherein pure molten aluminum or zirconium oxide is sprayed on the element. To introduce color into the finished heating element varying amounts of different oxides may be added to the aluminum oxide before it is applied such as chromium oxide and titanium oxide. Chromium oxide produces colors ranging from pink to deep red depending upon the quantity added; while titanium oxide produces various shades of blue. Pure aluminum oxide produces a pure white coating.

In FIGURE 2 a completed heating element is shown. The numbers correspond to the zones indicated in FIGURE 1. Leads 21 are shown attached according to the description above.

In FIGURE 3 a different configuration is shown illustrating that the heating elements can be cast in any desired shape. This configuration is particularly suited for use as a surface burner in a cooking stove. Figure 4 is a bottom view of the same element. Areas designated 34, 33, 32 are those that are richer in metal than the intermediate areas which are the chief heating areas. Leads 39, 38 and 35 are brought down to switch 37. Here various heating levels may be obtained by connecting voltage source 36 across various portions of the element. Assuming the voltage source has perfect regulation (i.e. does not experience a voltage drop with increased loading), that the resistance from zone 33 to zone 32 is equal to $R_1$, and that the resistance between zones 33 and 34 is $R_2$ which is also equal to $R_1$, then:

For low heat $$I_1 = \frac{V}{R_1 + R_2} = \frac{1V}{2R_1}$$

For medium heat $$I_2 = \frac{V}{R_1} \text{ or } \frac{V}{R_2}$$

For high heat $$I_3 = \frac{V}{\dfrac{1}{\dfrac{1}{R_1} + \dfrac{1}{R_2}}} = \frac{2V}{R_1}$$

The current being directly representative of the amount of power that can be accommodated by the unit.

The coating of refractory oxide extends over the entire heating element. When the unit is placed in stove 40 its top surface will be flush with that of the stove and yet will be insulated electrically from the metal structure of the stove. The top of the stove is indented to accommodate the element providing holes at the bottom for the leads of the heating element to pass through.

The end use of heating element will determine the metal and the refractory insulation used.

A low cost refractory insulation, such as a silicate or a silicate-oxide system or a pure oxide such as aluminum oxide or magnesium oxide or mixtures of oxides, can be used with a suitable metal. A metal alloy such as a nickel-chromium alloy or nickel-iron chromium alloy would be the most feasible metal to use in a household stove or oven.

In the use of a furnace heating element, for use at high temperatures with inert atmospheres or vacuum, a number of different combinations can be used depending largely upon the furnace temperature desired and are listed as follows:

(1) Zirconium oxide—Iridium may be used up to 2300° C.
(2) Zirconium oxide—Molybdenum may be used up to 2450° C.
(3) Zirconium oxide—Tungsten may be used up to 2650° C.
(4) Magnesium oxide—Tungsten may be used up to 2750° C.
(5) Aluminum oxide—Carbon may be used up to 1700° C.
(6) Zirconium oxide—Graphite may be used up to 2300° C.

Furnace heating elements for use at high temperatures in oxygen or air are listed as follows:

(1) Aluminum oxide—Platinum may be used up to 1700° C.
(2) Aluminum oxide—80% platinum, 20% rhodium alloy may be used up to 1800° C.
(3) Magnesium oxide—Molybdenum may be used up to 2450° C.

FIGURE 5 points up the comparative heat distributions of conventional stove heating units and the present invention. FIGURE 5A is a cross sectional view of the usual round heating unit when cut across its diameter. FIGURE 5B is a cross sectional view of the present invention when cut across its diameter. The heat distribution as represented by the arrows is quite uniform in the present invention while the conventional unit is quite varied.

The ratio of metal to refractory oxide is determined by the ultimate physical size of the heating unit, and its desired resistivity. Additionally, it will be noted that better conducting metals required a proportionally lower ratio of metal to refractory oxide than a poor conductor of comparable physical size and resistance. The size of the element and the material used will also determine the pressure that is to be applied to the material when placed in a die. We have employed pressures ranging from 500 p.s.i. to 200,000 p.s.i. in a variety of elements. The temperature for diffusion is related to the melting quality of the metal and has ranged between 500° C. and 2000° C.

In determining temperature, an approximate rule of thumb would be to raise the material to a temperature corresponding to two thirds of the metal's absolute melting temperature.

While we have described the above principles of our invention in connection with specific apparatus, it is to be clearly understood that this description is only made by way of example and not as a limitation on the scope of our invention as set forth in the objects thereof and in the accompanying claims.

We claim:

1. An electric heating element comprising:
    at least one heating zone of a preselected finely divided metal dispersed uniformly throughout a preselected refractory insulator;
    at least two conducting zones of similar material to said heating zones bearing a much higher ratio of metal to refractory insulator;
        said heating and conducting zones prearranged to provide a substantially broad uniform heating surface
        the interface between said heating and conducting zones prearranged to provide a gradual transition in metal richness such that destructive thermal stresses are therefore avoided;
    leads fastened to said conducting zones;
    a coating of said refractory insulator extending over said entire element with said leads projecting through said coating providing a strong electrically insulated surface capable of intimate contact with vessels to be heated.

2. An electric heating element according to claim 1 wherein said refractory insulator is one selected from the group consisting of $Al_2O_3$, $ZrO_2$, $MgO$, and $SiO_2$.

3. An electric heating element according to claim 2 wherein said finely divided metal is nickel-chrome alloy.

4. An electric heating element according to claim 2 wherein said finely divided metal is iron.

5. An electric heating element according to claim 1 wherein said metal is platinum and said refractory insulator is aluminum oxide.

6. An electric heating element according to claim 1 wherein said metal is an alloy of platinum and rhodium and said refractory insulator is aluminum oxide.

7. An electric heating element according to claim 1 wherein said metal is iridium and said refractory oxide is zirconium oxide.

References Cited by the Examiner

UNITED STATES PATENTS

| | | | |
|---|---|---|---|
| 792,638 | 6/1905 | Whitney | 29—155.71 |
| 942,555 | 12/1909 | Hankin | 338—224 |
| 1,816,194 | 7/1931 | Power | 264—105 |
| 2,082,102 | 6/1937 | Fisher | 29—155.71 |
| 2,679,568 | 5/1954 | Smith et al. | 338—330 X |
| 2,848,586 | 8/1958 | Wainer et al. | 338—330 X |
| 2,859,321 | 11/1958 | Garaway | 219—543 X |
| 2,861,163 | 11/1958 | Asakawa | 338—224 X |
| 2,883,502 | 4/1959 | Rudner | 338—330 |
| 2,903,666 | 8/1959 | Krellner | 338—330 |
| 3,051,924 | 8/1962 | Ambery et al. | 338—330 |
| 3,100,884 | 8/1963 | Ballard | 338—224 |

FOREIGN PATENTS

| | | |
|---|---|---|
| 601,603 | 12/1925 | France. |
| 361,960 | 11/1931 | Great Britain. |
| 479,537 | 3/1953 | Italy. |

RICHARD M. WOOD, *Primary Examiner.*

V. Y. MAYEWSKY, *Assistant Examiner.*